United States Patent [19]

Ohtani et al.

[11] Patent Number: 4,942,347
[45] Date of Patent: Jul. 17, 1990

[54] MOTOR DRIVE CIRCUIT

[75] Inventors: Kenji Ohtani; Yorinobu Murayama, both of Kyoto, Japan

[73] Assignee: Rohm Co., Ltd., Japan

[21] Appl. No.: 437,225

[22] Filed: Nov. 16, 1989

[30] Foreign Application Priority Data

Nov. 16, 1988 [JP] Japan .................. 63-289247
Nov. 26, 1988 [JP] Japan .................. 63-298481
Nov. 26, 1988 [JP] Japan .................. 63-298482

[51] Int. Cl.$^5$ ............................. H02P 7/06
[52] U.S. Cl. .................... 318/434; 318/432; 318/472
[58] Field of Search ............ 318/138, 254, 432, 434, 318/471, 472

[56] References Cited

U.S. PATENT DOCUMENTS 4,227,127 10/1980 Fukaya et al. ............... 318/459 X
4,338,551 7/1982 Mizumoto .................... 318/254
4,472,666 9/1984 Akeda et al. ................. 318/254
4,496,885 1/1985 Nitschke ..................... 318/122
4,633,358 12/1986 Nagano ..................... 318/434 X Primary Examiner—Bentsu Ro
Attorney, Agent, or Firm—Griffin, Branigan & Butler

[57] ABSTRACT

There is disclosed a motor drive circuit, into which an output circuit for supplying a drive output to a motor is incorporated, having a temperature compensating circuit or an output current regulating circuit added to a transistor, interposed between a servo IC for generating a servo signal and the output circuit, for supplying the output circuit with a drive current corresponding to the control output. A dependency on the temperature is obviated by arbitrarily setting an operating point of the output current and compensating temperature characteristics, and the motor is thereby protected from an excessive current.

9 Claims, 5 Drawing Sheets

MOTOR DRIVE CIRCUIT

BACKGROUND OF THE INVENTION

1. Field of the Invention

The present invention is directed to a motor drive circuit employed for driving a motor in accordance with a servo output obtained by a servo IC.

2. Description of the Prior Art

A conventional motor servo circuit incorporates a drive IC, serving as a control unit together with a servo IC, for supplying a drive output to a motor. The drive IC in turn incorporates a motor drive circuit for supplying a drive output as well as including an output circuit for permitting a flow of a drive current to the motor.

Turning attention to FIG. 7, there is depicted a prior art motor drive circuit, in which a servo signal $V_{IN}$ is applied from the servo IC to an input terminal 2. The servo signal $V_{IN}$, which is generated by the servo IC, consists of an FG signal showing a motor revolution and a PG signal indicating a rotary phase of the motor. The servo signal $V_{IN}$ represents a torque command signal for the motor to be driven. Upon an application of the servo signal $V_{IN}$, a current $I_1$ corresponding to the servo signal $V_{IN}$ flows via a resistance 6 into a base of a transistor 4; and a current $I_3$ then flows into a transistor 4 and a resistance 8 as well, corresponding to the current $I_1$. The current $I_3$ subsequently runs into an input-side transistor 101 of transistors 101 and 102 of a current mirror circuit 10, while the transistor 102 receives an inflow of a current $I_2$ in accordance with an emitter area ratio of the transistors 101 and 102. An output circuit 12 is supplied with the current $I_2$ via the transistor 102, and at the same moment a power supply voltage Vcc is impressed thereon from a power supply terminal 13.

The output circuit 12 is provided with a current detecting terminal 14 for detecting an output current $I_{OUT}$, and a resistance 16 for detection is connected between the current detecting terminal 14 and an earth. Based on this configuration, the current $I_3$ passing through a transistor 4 then flows via a resistance 8 to the current detecting terminal 14. Simultaneously, the current detecting terminal 14 admits a current $I_{10}$ coming from the output circuit 12. The output current $I_{OUT}$ obtained by synthesizing the currents $I_3$ and $I_{10}$ runs into a resistance 16, whereby a voltage $V_{ATC}$ corresponding to the output $I_{OUT}$ is generated at the current detecting terminal 14.

Connected to the output circuit 12 are Y-connected filed coils 18a, 18b and 18c of a motor 18. Applied to the output circuit 12 are control signals from a revolution control unit 22 on the basis of drive angle control signals Va, Vb and Vc applied to revolution control terminals 20a, 20b and 20c. Hence, the field coils 18a to 18c of the motor 18 are supplied with drive currents based on the control signals, and rotary outputs corresponding to the drive angle control signals Va to Vc are obtained in the motor 18. The rotary outputs are in turn controlled in accordance with the servo signals $V_{IN}$.

The thus constructed motor drive circuit exhibits characteristics illustrated in FIG. 8. Set in the servo signal $V_{IN}$ is a threshold voltage $V_1$ determined by a base-emitter voltage $V_{BE}$ of the transistor 4. The transistor 4 is brought into a non-conductive state in such a region d1 that a level of the servo signal $V_{IN}$ does not exceed the threshold voltage $V_1$.

In a transition region d2 wherein the output current $I_{OUT}$ fluctuates in such a manner that the level of the servo signal $V_{IN}$ increases over the threshold voltage $V_1$ and reaches a voltage $V_2$, the output $I_{OUT}$ is given by:

$$I_{OUT} = \frac{V_{IN} - I_1 \cdot R_1 - V_{BE} - I_3 \cdot R_2}{R_{NF}} \quad (1)$$

where $R_1$ and $R_2$ are the resistance values of the resistances 6 and 8, and $R_{FN}$ is the resistance value of the resistance 16.

When an input impedance of the motor drive circuit is high, and if $I_3 \cdot R_2 << V_{ATC}$, the formula (1) is expressed such as:

$$I_{OUT} = \frac{V_{IN} - V_{BE}}{R_{NF}} \quad (2)$$

Therefore, it follows that the output current $I_{OUT}$ is controlled by the servo signal $V_{IN}$.

In the region d3 wherein the level of the servo signal $V_{IN}$ increases in excess of the transition region d2, the output current $I_{OUT}$ determined depending on a limit of a drive capability of the output circuit 12 keeps a constant value even when the level of the servo signal $V_{IN}$ rises.

Hence, the motor drive circuit constitutes a voltage input circuit in which to determine a voltage range of a bias operating point of the servo signal $V_{IN}$. An operating point of the output current $I_{OUT}$ is therefore univalently determined. The base-emitter voltage of the transistor which determines the threshold voltage $V_1$ of the servo signal $V_{IN}$ has a typical temperature characteristic of $-2$ mV/°C., and it follows that the threshold voltage $V_1$ is possessed of a similar temperature characteristic. There is obviously a dependency on the temperature.

SUMMARY OF THE INVENTION

It is a primary object of the present invention to provide a motor drive circuit capable of arbitrarily setting an operating point of an output current and obviating a dependency on the temperature.

To this end, according to one aspect of the invention, in a motor drive circuit incorporating an output circuit for supplying a drive output to a motor, there is provided the improvement characterized by comprising: a differential amplifier for generating a current corresponding to a servo signal; a first current mirror circuit supplied with the current obtained by the differential amplifier; a current-voltage converting means for converting a current flowing through the first current mirror circuit; a buffer circuit for permitting passage of a voltage obtained by the current-voltage converting means; a first transistor bias-set by the voltage acquired through the buffer circuit and supplied with the current from the first current mirror circuit; and a second current mirror circuit for supplying a drive output obtained by the first transistor to the output circuit. In accordance with the present invention, it is possible to arbitrarily set the operating point of the servo signal, eliminate the dependency on the temperature of the operating point and improve the controllability.

According to another aspect of the invention, there is provided a motor drive circuit further comprising a third transistor, incorporated into the buffer circuit, for controlling a current flowing through the first transistor in accordance with a control input applied to the base, whereby an output current is regulated by a control input other than the servo signal. According to the present invention, the maximum value of the output current can be controlled by the control input other than the servo signal, and a load of the motor or the like can be protected from damages caused by an excessive output current.

According to still another aspect of the invention, there is provided a motor drive circuit in which the first transistor is supplied with the current via the first current mirror circuit. According to the present invention, the maximum value of the output current can be controlled by the control input other than the servo signal. When a voltage of the control input is zero, the output current can surely be set to zero, thereby ameliorating the controllability and protecting the load of the motor or the like from the damages due to the excessive output current.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENTS

Illustrative embodiments of the present invention will hereinafter be described in detail with reference to the accompanying drawings.

Figure 1:
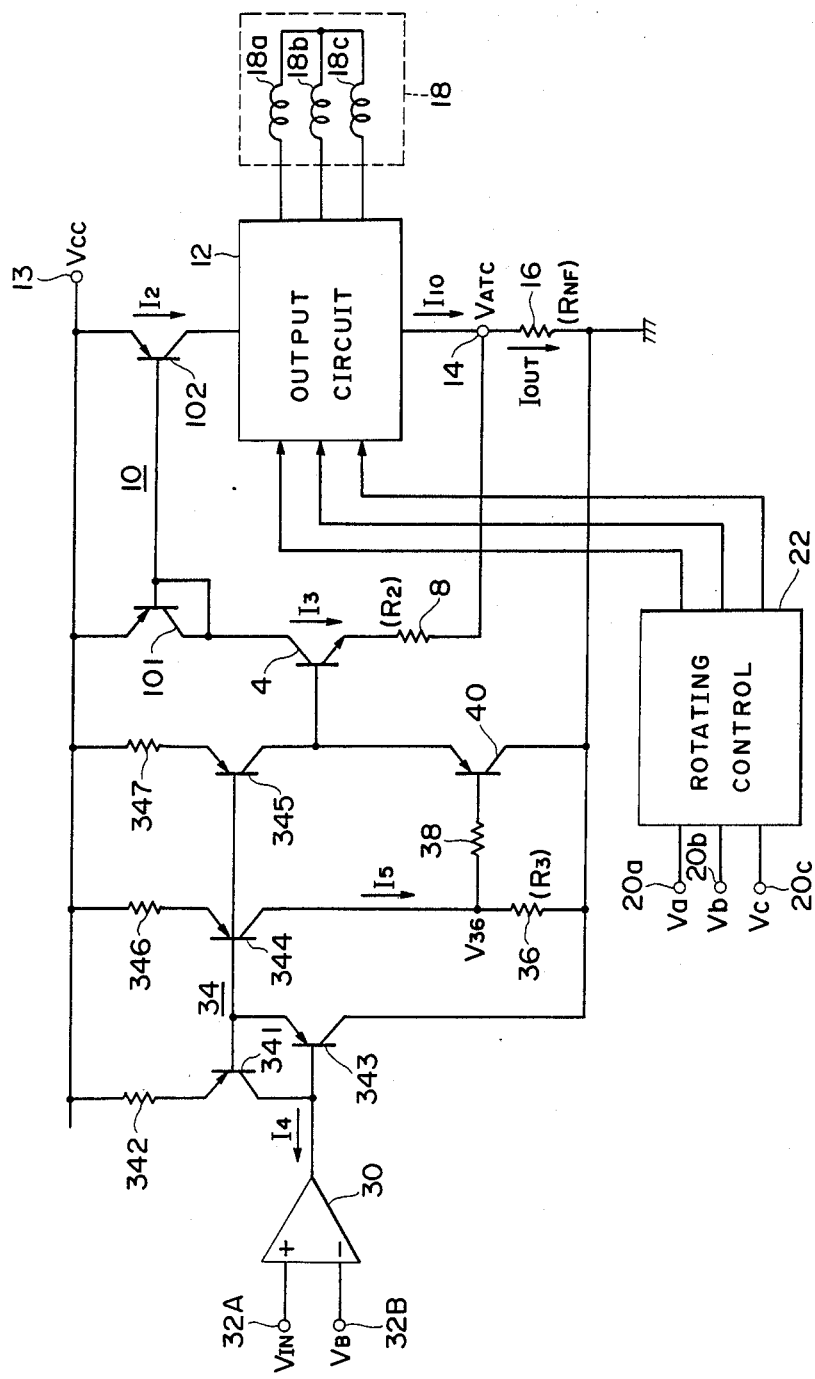
FIG. 1 is a circuit diagram depicting a first embodiment of a motor drive circuit of the present invention.
Figure 2:
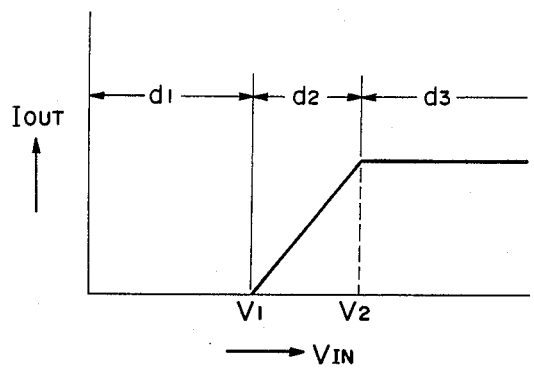
FIGS. 2 and 3 are diagram each showing operational characteristics of the motor drive circuit illustrated in FIG. 1.

Referring first to FIG. 1, there is illustrated a first embodiment of a motor drive circuit of the present invention.

Provided in an input unit to which a servo output is applied from an output unit of a servo IC is a current output type differential amplifier 30 having its positive-phase input terminal (+) to which a servo signal $V_{IN}$ representing a torque command signal as a servo output from the servo IC is applied via an input terminal 32A and its negative-phase input terminal (−) to which a constant bias voltage $V_B$ is applied via an input terminal 32B. The differential amplifier 30 is classified as the current output type, and hence a current $I_4$ corresponding to the servo signal $V_{IN}$ is outputted to an output thereof and flows, as an input current, into a first current mirror circuit 34.

Disposed in the current mirror circuit 34 on a current input side are a resistance 342 and a transistor 341 a base-collector part of which is short-circuited by a emitter-base part of a transistor 343, thus constituting a diode circuit. Therefore, the base of the transistor 341 is connected in common to the bases of transistors 344 and 345. With this arrangement, a current $I_5$ corresponding to an emitter area ratio of the transistor 341 to the transistors 344 and 345 flows into a resistance 346 and a transistor 344 due to current mirror effects.

The current $I_5$ runs into a resistance 36 provided as a current-voltage converting means. The current $I_5$ is converted into a voltage $V_{36}$ ($=I_5 \cdot R_3$) with a product, given by $I_5 \times R_3$, of the current $I_5$ and the resistance value $R_3$, where $R_3$ is the resistance value of the resistance 36. The voltage $V_{36}$ acquired by the resistance 36 is applied between the base and the emitter of a PNP-type transistor 40 constituting a buffer circuit via a resistance 38. Note that the transistor 4 is disposed as a first transistor, while the transistor 40 is provided, as a second transistor, for setting a bias to the base of the transistor 4.

An input impedance of the transistor 40 is small, and a base current $I_B$ of the transistor 40 is considerably smaller than a collector current $I_C$ ($I_C \gg I_B$). Let $V_{BE40}$ be a base-emitter voltage of the transistor 40, and a voltage $V_{B4}$ is set as a bias voltage in the base of the transistor 4, the voltage $V_{B4}$ being given by:

$$V_{B4} = V_{36} + V_{BE40} \tag{3}$$

Let $R_2$ be a resistance value of the resistance 8, and let $I_3$ be a current flowing through the transistor 4. The formula (3) is expressed such as:

$$V_{B4} = V_{BE4} + I_3 \cdot R_2 + I_{OUT} \cdot R_{NF} \tag{4}$$

The current $I_3$ corresponding to the base-emitter voltage $V_{BE4}$ flows through the transistor 4, whereby the base-emitter voltage $V_{BE4}$ of the transistor 4 is determined upon establishing the servo signal $V_{IN}$.

The current $I_3$ running through the transistor 4 then flows into a transistor 101 of a second current mirror circuit 10 composed of diode-connected transistors 101 and 102. The current $I_2$ flows into the transistor 102 in accordance with the emitter area ratio of the transistors 101 and 102.

The current $I_2$ is fed as a drive output to the output circuit 12 for driving the motor 18, while a current $I_{10}$ flows from the output circuit 12. Flowed into the resistance 16 connected between the current detecting terminal 14 and the earth is the output current $I_{OUT}$ conceived as a synthesized current of the current $I_{10}$ coming from the output circuit 12 and the current $I_3$ on the side of the transistor 4. The voltage $V_{ATC}$ corresponding to the output current $I_{OUT}$ is generated at the current detecting terminal 14. Consequently, the transistor forms a feedback circuit for feeding back the output current $I_{OUT}$ via the resistance 16, and the voltage $V_{ATC}$ generated in the resistance is fed back to the base of the transistor 4.

Under such conditions that the resistance value $R_{NF}$ of the resistance 16 is constant and a relation such as $I_3 \cdot R_2 \ll I_{OUT} \cdot R_{NF}$ is established, when the output current $I_{OUT}$ increases, the base voltage $V_{B4}$ of the transistor 4 is reduced to thereby decrease the output current $I_{OUT}$. Whereas if the output current $I_{OUT}$ is reduced, the base voltage $V_{BE4}$ is incremented to thereby increase the output current $I_{OUT}$. The feedback operation is thus effected.

Connected to the output circuit 12 are Y-connected field coils 18a to 18c of a motor 18. Applied to the output circuit 12 are control signals from a rotary control unit 22 on the basis of drive angle control signals Va, Vb and Vc applied to revolution control terminals 20a, 20b and 20c. The output circuit incorporates a drive output unit for causing flows of drive voltages to the field coils 18a through 18c, thereby obtaining output currents corresponding to the drive angle control signals Va to Vc which are in turn fed to the field coils 18a to 18c. Therefore, the rotary outputs corresponding to the drive angle control signals Va to Vc can be acquired, and at the same time rotary velocities thereof are controlled in accordance with the servo signal $V_{IN}$ applied to an input terminal 32A of the motor drive circuit.

A current $I_4$ flowing through a transistor 341 in accordance with the servo signal $V_{IN}$ and a current $I_5$ running through a transistor 344 can be set to the same value by equalizing the emitter area ratios of the transistors 341 and 344. The current $I_5$ has already been converted into the voltage $V_{36}$ (=$I_5.R_3$) by means of the resistance 36. If an input impedance of the transistor 4 is high, and when $I_3.R_2 << V_{ATC}$, the output current $I_{OUT}$ is given by:.LS1

$$I_{OUT} = \frac{I_5 \cdot R_3}{R_{NF}} \tag{5}$$

The output current $I_{OUT}$ is proportional to the resistance value $R_3$ of the resistance 36 and is therefore controlled by the resistance value $R_3$. If the respective resistance values $R_3$ and $R_{NF}$ are constant, the output current $I_{OUT}$ is controlled by the servo signal $V_{IN}$, because the output current is proportional to the current $I_5$.

In this motor drive circuit, the characteristics can be inverted on the basis of either a negative-phase input or a positive-phase input of the differential amplifier 30. For instance, where the basis is set to a negative input terminal (−) of the differential amplifier 30, as illustrated in FIG. 20, the output current $I_{OUT}$ flows from a region d2 in which the level of the servo signal $V_{IN}$ exceeds the threshold voltage $V_1$, and a servo operation is thus attained. The symbol d1 designates a region wherein no output current $I_{OUT}$ flows, d2 represents a transition region of the output current $I_{OUT}$, and d3 denotes a stable region of the output current $I_{OUT}$.

Figure 3:
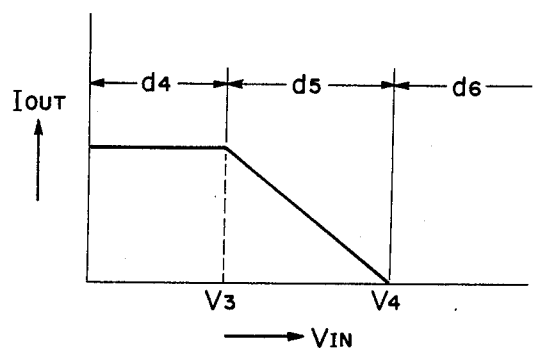

Whereas if the basis is set to a positive-phase input terminal (+) of the differential amplifier 30, as illustrated in FIG. 3, the output current $I_{OUT}$ flows from regions d4 and d5 in which the servo signal $V_{IN}$ is smaller than a threshold $V_4$. The servo operation is attained in this manner. The symbol d4 indicates a stable region of the output current $I_{OUT}$, d5 denotes a transition region thereof, and d6 stands for a release region thereof.

It is therefore possible to arbitrarily set an operating point of the output current $I_{OUT}$ by varying values of the threshold voltages $V_1$ and $V_4$ each defined as the basis.

Apropos of a temperature dependency of the servo signal $V_{IN}$, temperature characteristics of the transistor 4 are obviated by an addition of a transistor 40 to the transistor 4. Where the temperature characteristic of a base-emitter voltage $V_{BE40}$ of the transistor 40 is set to −2 mV/°C., its operating point comes to have the temperature characteristic of −2 mV/°C. Besides, a base-emitter voltage $V_{BE4}$ of the transistor 4 and its operating point have the like temperature characteristic. Hence, the voltage $V_{36}$ (=$R_3.I_5$) generated in the resistance 36 is expressed from the formula (3) as follows:

$$V_{36} = V_{ATC} - V_{BE40} + V_{BE4} \tag{6}$$

Supposing that there exists the same temperature characteristic of −2 mV/°C. by adjusting the emitter area ratios of the individual transistors 4 and 40, the following equation is established.

$$\begin{aligned} \frac{\partial V_{36}}{\partial T} &= -\frac{\partial V_{BE40}}{\partial T} + \frac{\partial V_{BE4}}{\partial T} \\ &= -(-2) + (-2) \\ &= 0 mV/°C. \end{aligned} \tag{7}$$

Thus, the temperature characteristics of the transistors 4 and 40 are offset, as a result of which a current $I_2$ having no temperature coefficient can be obtained. It therefore follows that the temperature dependency in the motor drive circuit is obviated.

Based on the motor drive circuit, it is feasible to arbitrarily set the operating point of the servo signal, obviate the temperature dependency of the operating point and improve the controllability.

Figure 4:
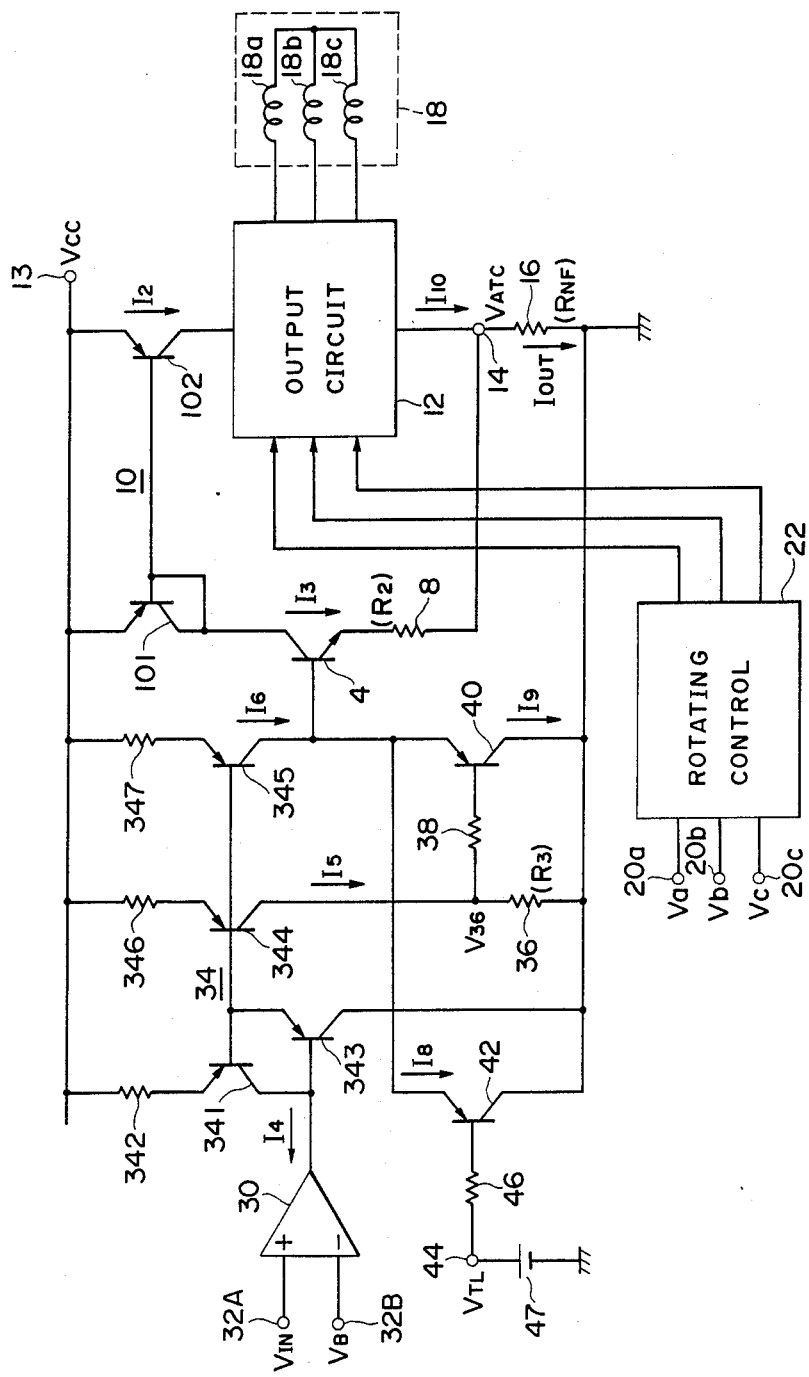
FIG. 4 is a circuit diagram depicting a second embodiment of the motor drive circuit of the invention.

Turning next to FIG. 4, there is shown a second embodiment of the invention.

An arrangement of the motor drive circuit in the second embodiment is that an emitter of a transistor 42 provided as a third transistor is connected in common to the transistor 40 constituting a buffer circuit, the transistors 40 and 42 being combined to form a differential circuit for effecting a comparator operation. In the thus arranged motor drive circuit, the emitters of the transistors 40 and 42 are direct-coupled, and hence a gain is high. If magnitudes of a voltage $V_{36}$ and a control input voltage $V_{TL}$ applied from a voltage source 47 to a control input terminal 44 are expressed such as $V_{TL} > V_{36}$, the transistor 42 comes into a cut-off state. When $V_{TL} < V_{36}$, the transistor 40 also assumes the cut-off state. When the transistor 42 is in the cut-off state, a current defined by $I_6 = I_9$ flows into the transistor 40. When the transistor 40 is likewise in the cut-off state, a current defined by $I_6 = I_8$ runs into the transistor 42.

When $V_{TL} < V_{36}$, the base voltage $V_{B4}$ of the transistor 4 is given by:

$$V_{B4} = V_{TL} + V_{BE42} \tag{8}$$

where $V_{BE42}$ is the base-emitter voltage of the transistor 42. Hence, the formula (8) is equalized to the formula (4). The characteristics of the transistors 40 and 42 are arranged, with the result that $V_{BE40} = V_{BE42}$. When $V_{TL} > V_{36}$, there flows a current corresponding to a voltage $V_{B4}$ as in the case of $V_{TL} < V_{36}$, and the feedback is effected.

Assuming that the characteristics of the base-emitter voltages $V_{BE40}$ and $V_{BE42}$ of the transistors 40 and 42 are equally set, it is feasible to control a base potential of the transistor 4 owing to the transistors 40 and 42, because the respective emitters are common. More specifically, if the magnitudes of the voltage $V_{36}$ and the control input voltage $V_{TL}$ are expressed such as $V_{TL} < V_{36}$ generated in the resistance 36, transistor 42 becomes conductive instead of the transistor 40, resulting in exertion of influences on the transistor 4. The output current $I_{OUT}$ is thus controlled by the control input voltage $V_{TL}$. In this case, the output current $I_{OUT}$ is given by:

$$I_{OUT} = \frac{V_{TL}}{R_{NF}} \quad (9)$$

Figure 5:
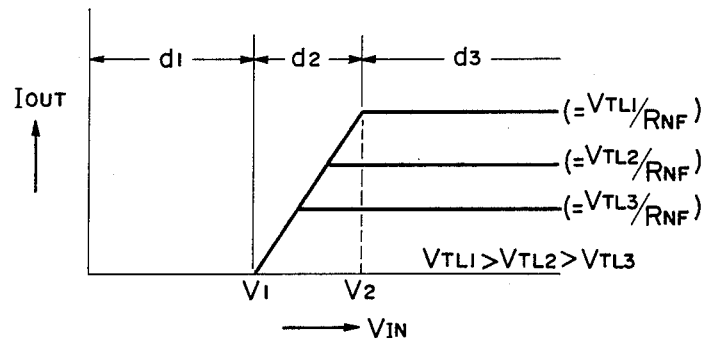
FIG. 5 is a diagram showing operational characteristics of the motor drive circuit illustrated in FIG. 4.

Therefore, as illustrated in FIG. 5, the control input voltage $V_{TL}$ is set to arbitrary voltages $V_{TL1}$, $V_{TL2}$ ... ($V_{TL1} > V_{TL2} > V_{TL3} > ...$), thereby controlling the maximum value of the output current $I_{OUT}$. The output current $I_{OUT}$ is controlled by the servo signal $V_{IN}$ within a range defined by the control input voltage $V_{TL}$. Referring again to FIG. 5, the symbol d1 represents a region in which the transistor 4 becomes nonconductive, d2 designates a transition region of the output current $I_{OUT}$, and d3 denotes a maximum current region.

As discussed above, the motor drive circuit of the present invention is capable of controlling the maximum value of the output current by the control input other than the servo signal, thereby protecting the motor from damages caused by the excessive output current.

Figure 6:
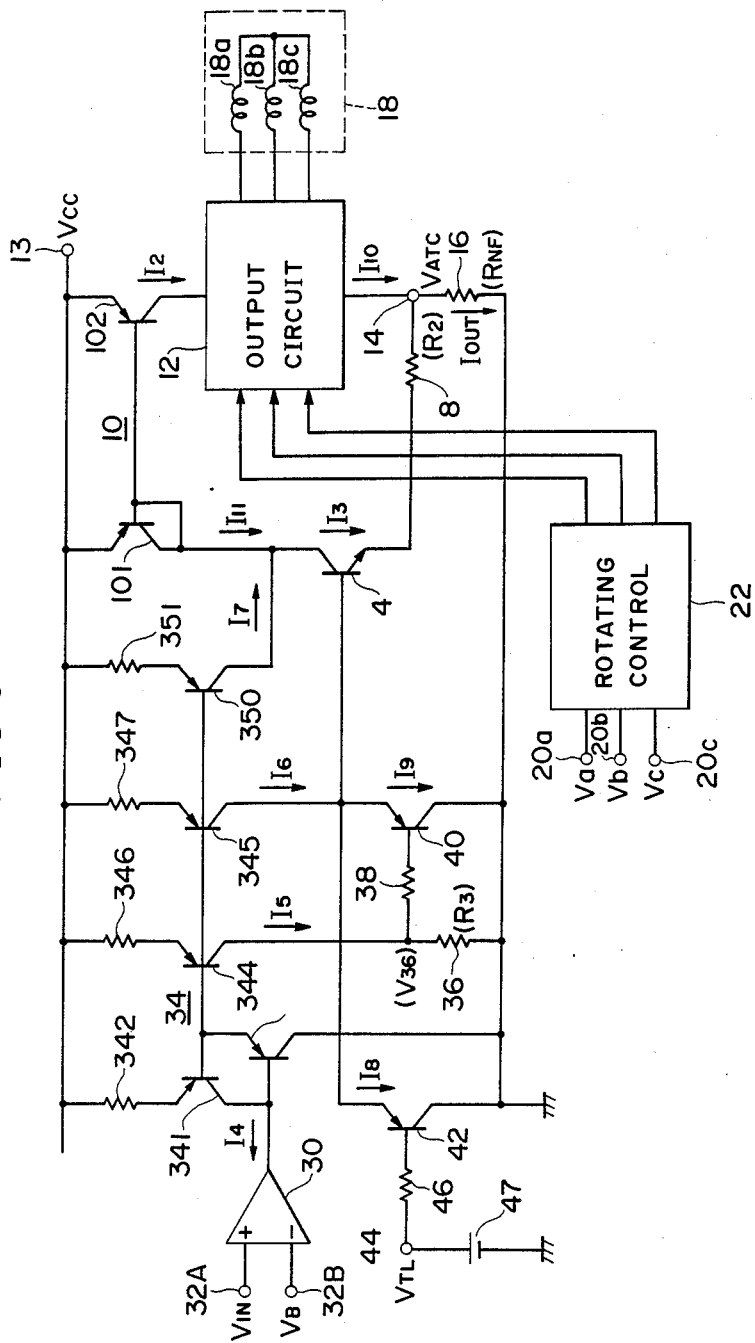
FIG. 6 is a circuit diagram depicting a third embodiment of the motor drive circuit of the invention.
Figure 7:
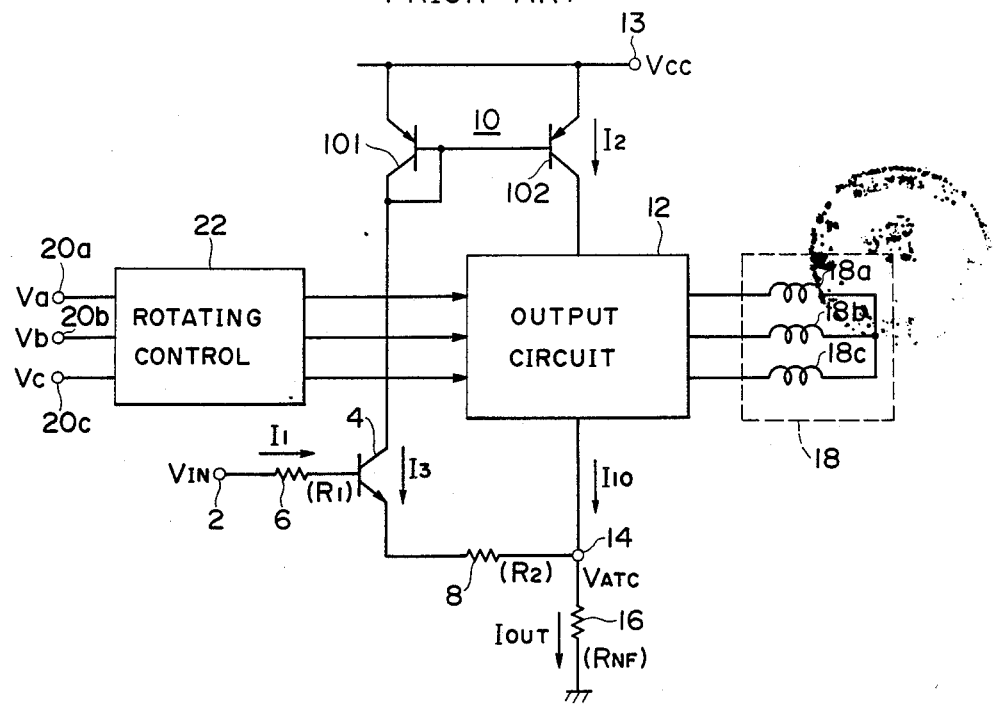
FIG. 7 is a circuit diagram illustrating a prior art motor drive circuit.
Figure 8:
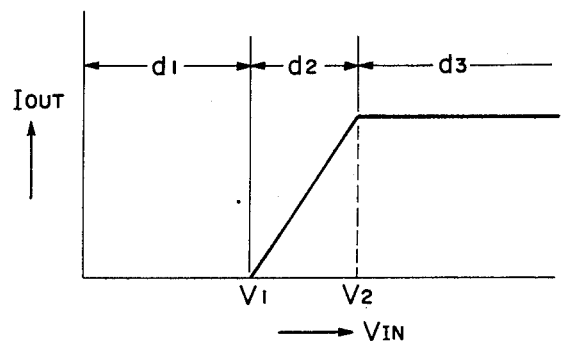
FIG. 8 is a diagram showing operational characteristics of the motor drive circuit illustrated in FIG. 7.

Referring next to FIG. 6, there is illustrated a third embodiment of the motor drive circuit of the invention.

The motor drive circuit in the third embodiment is constructed in such a way that a current mirror circuit 34 includes a resistance 342 and a transistor 341 serving as a fourth transistor on the side of the current input, the transistor 341 being diode-connected and having its base-collector part short-circuited by an emitter-base part of a transistor 343. Therefore, the base of the transistor 341 is connected in common to bases of sixth, seventh and eighth transistors 344, 345 and 350. In this configuration, the current $I_5$ corresponding to an emitter area ratio of the transistor 341 to the transistor 344 flows into a resistance 364 as well as into the transistor 344 owing to current mirror effects.

The transistors 40 and 42 come under a differential input type. The control input is the smaller of the control input voltage $V_{TL}$ to the base of the transistor 42 and the control input to the base of the transistor 40, and an output corresponding to this input is transmitted to the output circuit 12d. To be more specific, where the voltage $V_{36}$ and the control input voltage $V_{TL}$ bear a relation such as $V_{36} > V_{TL}$, a restriction may be given to the output current $I_{OUT}$.

Now, let $I_9$ be a current flowing through the transistor, and when $I_{OUT} > > I_3$, the control input voltage $C_{TL}$ is expressed by:

$$V_{TL} = -V_{BE42} + V_{BE4} + I_3 \cdot R_2 + V_{ATC} \quad (10)$$

When $V_{ATC} > > I_3 \cdot R_2$, and if the base-emitter voltages $V_{BE4}$ and $V_{BE42}$ of the transistors 4 and 42 are the same, the following relation is established.

$$V_{TL} = V_{ATC} = I_{OUT} \cdot R_{NF} \quad (11)$$

Hence, the output current $I_{OUT}$ is given by:

$$I_{OUT} = \frac{V_{ATC}}{R_{NF}} = \frac{V_{TL}}{R_{NF}} \quad (12)$$

The output current $I_{OUT}$ can be restricted by the control input voltage $V_{TL}$ impressed on a control input terminal 44.

When $V_{TL} < V_{36}$, a bias of the transistor 4 is set through an intermediary of the transistor 42. Whereas if $V_{TL} > V_{36}$, the bias is set through the transistor 40.

When $V_{36} = 0$, the current bears such a relation as $I_4 = I_5 = I_6 = I_7 = 0$ (A), whereby the transistors 341, 344, 345 and 350 come into the cut-off state. As a result, the output current $I_{OUT}$ becomes $I_{OUT} = 0$. When $V_{TL} < V_{36}$, and if $V_{TL} = 0$, a current defined by $I_7 = I_8$ flows into the transistor 4. Where the current is set such as $I_7 = I_3$, the resultant current is defined by $I_{11} = 0$. Then, the output current is brought into such a state as $I_{OUT} = 0$. When $V_{TL} < V_{36}$, and if $V_{TL} \neq 0$, the current $I_7$ flowing through the transistor 4 is set such as $I_7 > > I_{11}$, thereby obtaining characteristics with less offset. More specifically, when the voltage $V_{ATC}$ and the control input voltage $V_{TL}$ have a relation such as $V_{ATC} = V_{TL}$, the offset becomes zero. The controllability is further improved as the voltage $V_{ATC}$ approximates to the control input voltage $V_{TL}$. When $V_{TL} < V_{36}$, the voltage $V_{ATC}$ having a small amount of offset with respect to the voltage $V_{36}$ can similarly be obtained, and an output with less offset is thereby acquired. The transistor 350 is provided in the current mirror circuit 34, whereby the current $I_7 (= I_6)$ starts flowing. When $I_{11} < < I_7$ (the characteristics of the transistors 4 and 42 are arranged), the characteristics having less offset can be obtained even if $V_{TL} \neq 0$.

A relation between the control input voltage $V_{TL}$ and the voltage $V_{36}$ is set like this: $V_{TL} < V_{36}$, and if $V_{TL} = 0$ or in other cases, though the fact that the offset is diminished has been mentioned, the same situation can be applied to the transition region defined by $V_{TL} > V_{36}$. Namely, since no current $I_4$ flows when $V_{36} = 0$, the output current $I_{OUT}$ comes into a release state. When the voltage $V_{36}$ is set to values other than 0V, a value approximate to a relation of $V_{36} = V_{ATC}$ can be obtained as in the case of controlling the control input voltage $V_{TL}$ on condition that the characteristics of the transistors 40 and 42 are equalized. Thus, the characteristics of good controllability having small amount of offset are acquired.

Resistance values $R_{347}$ and $R_{351}$ of resistances 347 and 351 in the current mirror circuit 34 are equally set on the assumption that the characteristics of the transistors 345 and 350 are the same. Hence, the currents $I_6$ and $I_7$ become equal, and it follows that the transistor 4 is supplied with the current $I_6$. Emitter areas of the transistors 4 and 42 are adjusted, and when the base-emitter voltages $V_{BE4}$ and $V_{BE42}$ have a relation of $V_{BE4} = V_{BE42}$, the currents $I_3$ and $I_8$ of the transistors 4 and 42 come to have such a relation as $I_3 = I_8$.

The transistors 40 and 42 respectively perform a function as a comparator. When the control input voltage $V_{TL}$ bears a relation of $V_{TL} = 0$, the transistor 40 comes into the cut-off state.

For this reason, the currents $I_6$ and $I_8$ turn out to be $I_6 = I_8$, which in turn leads to a relation such as $I_6 = I_8 = I_7$. Hence, the currents $I_3$ and $I_7$ are expressed by $I_3 = I_7$.

If the control input voltage $V_{TL}$ has a relation of $V_{TL} = 0$, the transistors 101 and 102 cease their operations, thereby releasing the current $I_2$ with respect to the output circuit 12. Then stops the output current $I_{OUT}$. In consequence, when the control input voltage $V_{TL}$ to the control input terminal 44 is set to 0V, the voltage $V_{ATC}$ generated at the current detecting terminal 14 becomes $V_{ATC} = 0$.

Hence, the motor drive circuit of the invention is capable of controlling the maximum value of the output current by the control input other than the servo signal and surely making the output current zero when the control input voltage is zero. Besides, the controllability is ameliorated, and the load of the motor or the like can be protected from damages due to the excessive output current.

Although the illustrative embodiments have been described in detail with reference to the accompanying drawings, it is to be understood that the present invention is not limited to those precise embodiments. Various changes or modifications may be effected therein by one skilled in the art without departing from the scope or spirit of the invention.

What is claimed is:

1. In a motor drive circuit incorporating an output circuit for supplying a drive output to a motor, the improvement characterized by comprising:
   a differential amplifier for generating a current corresponding to a servo signal;
   a first current mirror circuit responsive to said current obtained by said differential amplifier;
   a current-voltage converting means for converting a current flowing through said first current mirror circuit;
   a buffer circuit for permitting passage of a voltage obtained by said current-voltage converting means;
   a first transistor having bias set by said voltage acquired by said buffer circuit and responsive to said current from said first current mirror circuit; and
   a second current mirror circuit for supplying a drive output, obtained by said first transistor, to said output circuit.

2. The motor drive circuit as set forth in claim 1, wherein said buffer circuit is composed of a second transistor.

3. The motor drive circuit as set forth in claim 1, further comprising a third transistor, disposed in said buffer circuit, for controlling a current running through said first transistor in accordance with a control input applied to a base thereof.

4. The motor drive circuit as set forth in claim 1, wherein the current is fed via said first current mirror circuit to said first transistor.

5. The motor drive circuit as set forth in claim 1, wherein the construction thereof involves the use of a semiconductor integrated circuit.

6. The motor drive circuit as set forth in claim 1, wherein said current-voltage converting means consists of a resistance.

7. The motor drive circuit as set forth in claim 2, wherein a resistance is connected to said output circuit, a current flowing out of said output circuit is converted into a voltage by said resistance, and said converted voltage is fed back to an emitter of said second transistor.

8. The motor drive circuit as set forth in claim 1, wherein said first current mirror circuit is composed of fourth and fifth transistors combined to constitute a diode circuit, a sixth transistor for permitting a flow of current to said current-voltage converting means and a seventh transistor for permitting a flow of current to said buffer circuit.

9. The motor drive circuit as set forth in claim 1, wherein said first current mirror circuit is composed of fourth and fifth transistors combined to constitute a diode circuit, a sixth transistor for permitting a flow of current to said current-voltage converting means, a seventh transistor for permitting a flow of current to said buffer circuit and an eighth transistor for supplying a current to said first transistor.

* * * * *